United States Patent [19]
Zhao et al.

[11] Patent Number: 5,313,466
[45] Date of Patent: May 17, 1994

[54] LOCAL SYNCHRONOUS BANDWIDTH ALLOCATION IN A TOKEN RING NETWORK

[75] Inventors: Wei Zhao; Biao Chen; Gopal Agrawal, all of College Station, Tex.

[73] Assignee: The Texas A&M University System, College Station, Tex.

[21] Appl. No.: 949,450

[22] Filed: Sep. 22, 1992

[51] Int. Cl.$^5$ .............................................. H04J 3/16
[52] U.S. Cl. ...................................... 370/85.4; 370/85.5; 340/825.05
[58] Field of Search ................. 370/85.4, 85.5, 85.12, 370/85.15; 340/825.05

[56] References Cited

U.S. PATENT DOCUMENTS 5,155,725 10/1992 Khalil .................................. 370/85.5
5,191,580 3/1993 Nakano et al. ..................... 370/85.5

OTHER PUBLICATIONS

"Guaranteeing Synchronous Message Deadlines with the Timed Token Protocol" by Gopal Agrawal, Biao Chen, Wei Zhao and Sadegh Davari, IEEE International Conference on Distributed Computing Systems, dated Jun. 1992.

Primary Examiner—Douglas W. Olms
Assistant Examiner—Melvin Marcelo
Attorney, Agent, or Firm—Baker & Botts

[57] ABSTRACT

A method for real time message transmission in a token ring network is provided. The method initializes each node in the network, including setting a maximum message transmission time $H_i$ for node i such that $$H_i = \frac{C_i}{\left[ a \cdot \frac{P_i}{TTRT} + 1 - 2a \right]},$$

where $C_i$ is the transmission time of a message in a message stream, $P_i$ is the period length of the message stream, and a is a non-negative constant between zero and one. The messages are then transmitted when a token arrives at a node for the duration of $H_i$. Using this method with the timed token protocol, the synchronous messages are guaranteed to be transmitted before their deadlines if the utilization of synchronous messages is no more than $$\frac{1}{2 + \frac{1}{a}}$$

of available utilization.

10 Claims, 3 Drawing Sheets

LOCAL SYNCHRONOUS BANDWIDTH ALLOCATION IN A TOKEN RING NETWORK

CROSS-REFERENCE TO RELATED APPLICATION

This patent application is related to co-pending patent application U.S. Ser. No. 07/949,043 entitled "Normalized Proportional Synchronous Bandwidth Allocation in a Token Ring Network" by Wei Zhao, et al., filed concurrently with the present patent application.

TECHNICAL FIELD OF THE INVENTION

This invention relates in general to the field of distributed processing, and more particularly the present invention relates to a method for local synchronous bandwidth allocation in a token ring network that utilizes timed token protocol carrying real time traffic.

BACKGROUND OF THE INVENTION

Distributed digital computers and microprocessors have been used for embedded real time applications such as space vehicle systems, image processing and transmission, and integration of expert systems into avionics and industrial process control. Such distributed systems have stringent timing requirements because they often operate in real time. Timing failures in these systems are impermissible since such failures may produce catastrophic results.

The key to success in using a distributed system for these applications is the timely execution of computation tasking by more than one microprocessor node as well as the communication of computed results and information among the nodes. End-to-end deadline guarantees are not possible without a communication network that supports the timely delivery of inter-task messages. Therefore, it is important that messages can be guaranteed to be transmitted to their destinations before their deadlines.

A particular protocol for real time communication between distributed nodes have recently received recognition as the ANSI standard for such systems. The protocol is the FDDI (Fiber Distributed Data Interface) token ring media access control, the details of which are available by consulting FDDI *Token Ring Media Access Control (MAC). ANSI Standard* X3.139, 1987. This protocol is suitable for real time applications not only because of its use in high capacity networks, but also due to the fact that it has the important property of bounded access time. Bounded access time is necessary for real time communications. The timed token protocol has been incorporated into many network standards, including the Fiber Distributed Data Interface (FDDI), IEEE 802.4, the High-Speed Data Bus and the High-Speed Ring Bus (HSDB/HSRB), and the Survivable Adaptable Fiber Optic Embedded Network (SAFENET). Many embedded real time applications use them as backbone networks. For example, the FDDI has been selected as a backbone network for NASA's Space Station Freedom.

With the timed token protocol, messages are grouped into two separate classes: synchronous and asynchronous. Synchronous messages arrive in the system at regular intervals and may be associated with deadline constraints. Timed token protocol is primarily concerned with the control of the token rotation time, which is defined as the time between two consecutive visits of the token to a particular node. At network initialization time, a protocol parameter called Target Token Rotation Time (TTRT) is determined which indicates the expected token rotation time. Each station is assigned a fraction of the TTRT, known as synchronous bandwidth, which is the maximum time for which a node is permitted to transmit its synchronous messages every time it receives the token. Once a node receives the token, it transmits its synchronous message, if any, for a time no more than its allocated synchronous bandwidth. It can then transmit its asynchronous messages only if the time elapsed since the previous token departure from the same node is less than the value of TTRT, i.e., only if the token arrived earlier than expected.

Guaranteeing a message deadline implies transmitting the message before its deadline. With a token passing protocol, a node can transmit its messages only when it captures the token. This implies that if a message deadline is to be guaranteed, the token should visit the node where the message is waiting before the expiration of the message's deadline. That is, in order to guarantee message deadlines in a token ring network, it is necessary to bound the time between two consecutive visits of the token to a node or the token rotation time. However, merely setting a limit for the token rotation time does not guarantee meeting message deadlines. A node with inadequate synchronous bandwidth may be unable to complete the transmission of a synchronous message before its deadline. On the other hand, allocating excess amounts of synchronous bandwidths to the nodes could increase the token rotation time, which may also cause message deadlines to be missed. Thus, guaranteeing message deadlines is also dependent on the appropriate allocation of synchronous bandwidths to the nodes in the distributed system.

It is widely recognized in the art of real time distributed systems that the allocation of synchronous bandwidth is an open problem with no known solution. Accordingly, it is desirable to provide a method for synchronous bandwidth allocation in a real time distributed system which guarantees message deadlines are met. Such a bandwidth allocation method should be especially compatible with the timed token protocol in order to adhere to industry standard requirements.

During the allocation of synchronous bandwidth, various types of information may be used such as the message parameters of various stations and the system parameters. Synchronous bandwidth allocation schemes can be categorized based on the type of information they use. An allocation scheme is local if it computes the synchronous bandwidth of a node without using the information of messages on other nodes. On the other hand, a global scheme utilizes system wide information, including the message periods and lengths on different nodes, the total utilization, the total number of message streams, etc., to compute the synchronous bandwidth of a node.

Since the local schemes compute the synchronous bandwidth of a node independently of the message parameters at other nodes, they have an advantage over the global schemes in the run time network management. At run-time, if a parameter of a message stream on some node is changed, with a local allocation scheme only the synchronous bandwidth of the involved node needs to be adjusted accordingly. No other node is disturbed. In other words, the entire network can continue its normal operation without disturbance while an individual node is changing its own message parameters and synchronous bandwidth.

SUMMARY OF THE INVENTION

In accordance with the present invention, local synchronous bandwidth allocation is provided which substantially eliminate or reduce disadvantages and problems associated with prior schemes.

In one aspect of the present invention, a method for real time message transmission in a token ring network is provided. The method initializes each node in the network, including setting a synchronous bandwidth which is the maximum message transmission time $H_i$ for node i such that $$H_i = \frac{C_i}{\left\lfloor a \cdot \frac{P_i}{TTRT} + 1 - 2a \right\rfloor},$$

where $C_i$ is the transmission time of a message in a message stream, $P_i$ is the period length of the message stream, and a is a non-negative constant. The synchronous messages are then transmitted when a token arrives at a node for the duration of $H_i$.

BRIEF DESCRIPTION OF THE DRAWINGS

For a better understanding of the present invention, reference may be made to the accompanying drawings, in which.

DETAILED DESCRIPTION OF THE INVENTION

Figure 1:
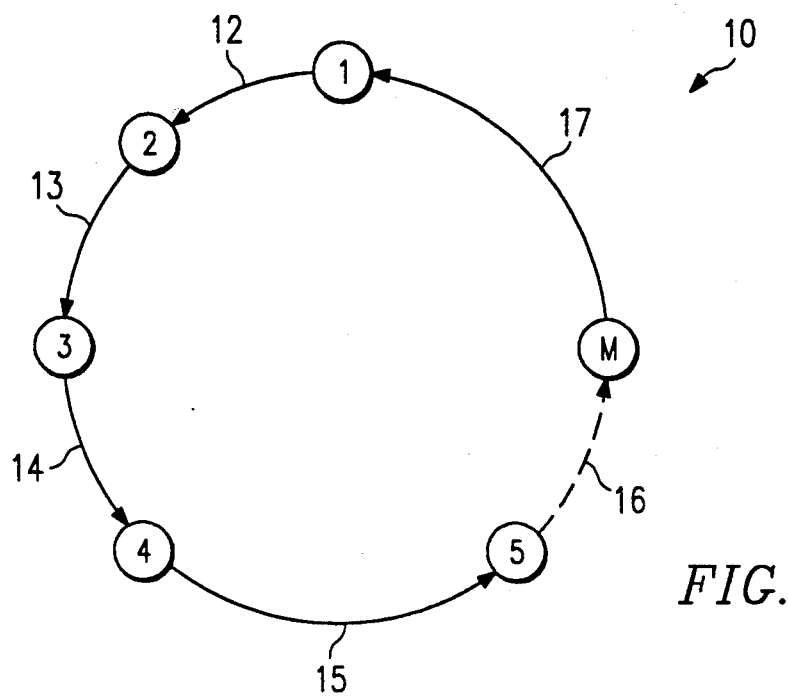
FIG. 1 is a simplified diagram of a token ring network.

With reference to the drawings, FIG. 1 illustrates a preferred embodiment of a distributed ring network, indicated generally at 10 and constructed according to the teaching of the present invention. Network 10 topology includes nodes or stations 1-m connected by point-to-point links 12-17 forming a ring. A token typically consisting of a predetermined bit pattern circulates around ring network 10 and visits each node 1-m. Only the node which has possession of the token may transmit messages.

Figure 2:
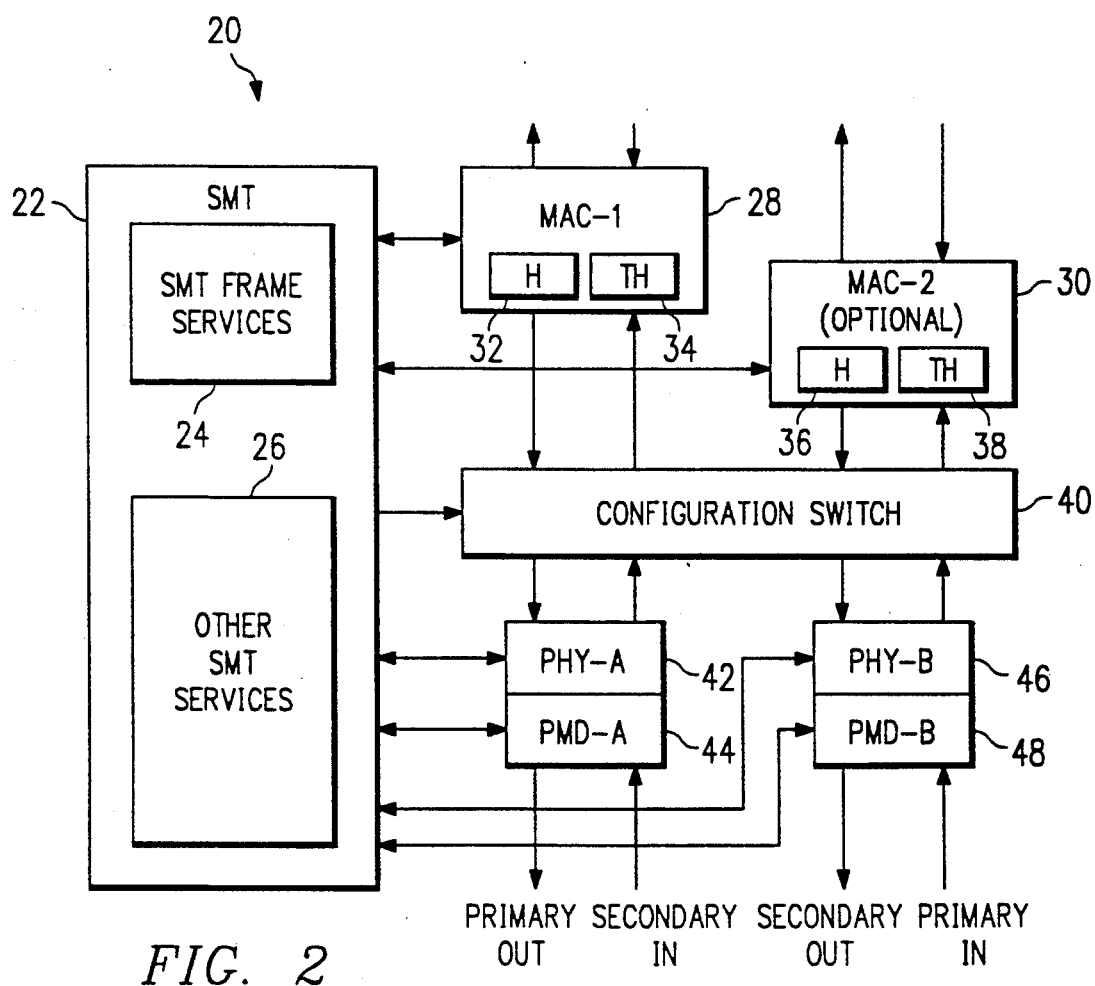
FIG. 2 is a simplified block diagram of a station architecture.
Figure 3:
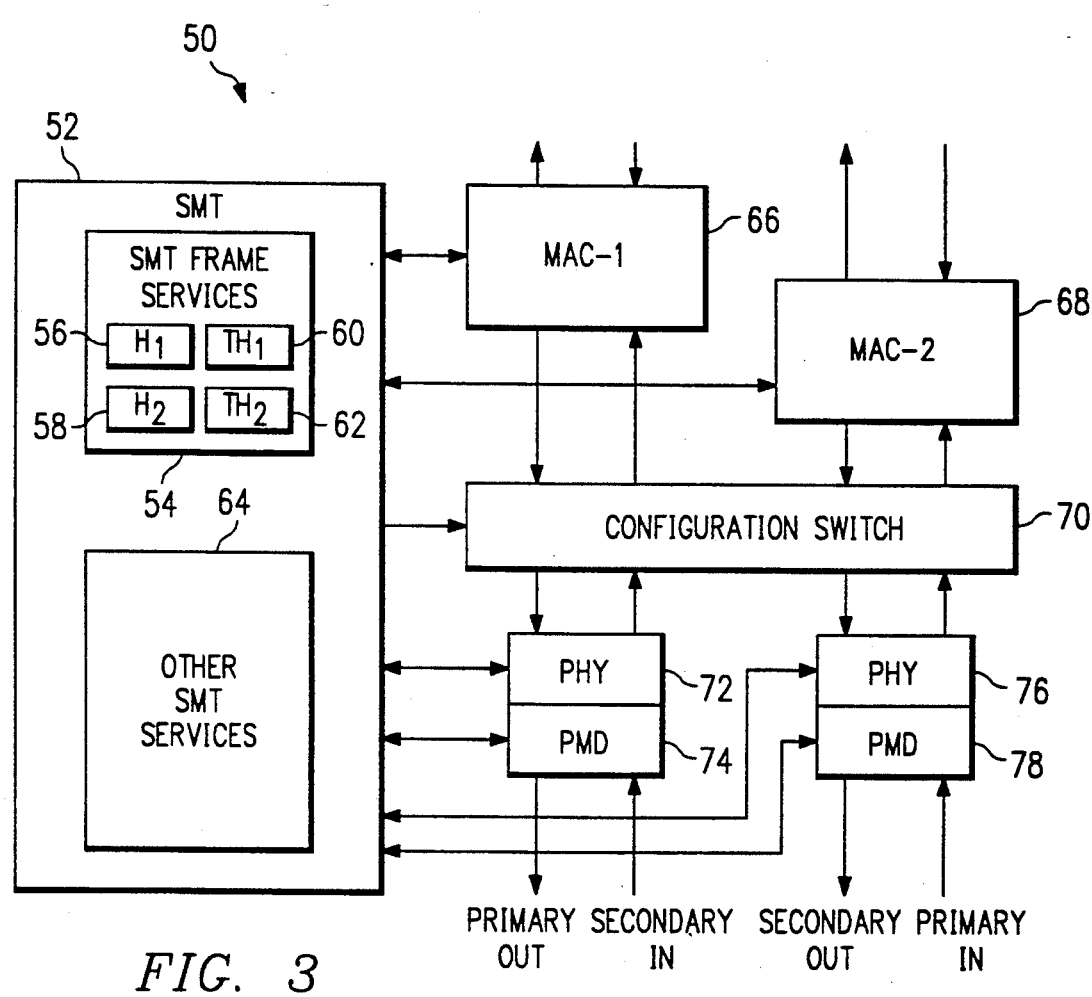
FIG. 3 is a simplified block diagram of an alternative architecture.

FIGS. 2 and 3 provide the physical hardware architecture of node i typically employed in timed token ring 10. Referring to FIG. 2, a simplified block diagram of the architecture of a FDDI (fiber distributed data interface) dual attachment station 20 is shown. The architecture shown is recommended by the FDDI ANSI standards, which may be consulted for details not described herein. Station management (SMT) 22 is a component responsible for the local portion of the network management application process. SMT 22 provides the control required for the proper internal configuration and operation of a node or station in an FDDI timed token ring. It further controls and coordinates the various activities between the various network layers in the computer network. SMT 22 includes SMT frame services 24 and other SMT management services 26.

SMT 22 is connected to media access control (MAC) 28 and 30, one of which may be an optional component. MAC 28 and 30 forms the lower sublayer of the data link layer and are responsible for access to the medium, addressing, data checking and data framing. MAC 28 and 30 communicate with SMT 22 to determine if any frame, synchronous or asynchronous, is to be transmitted. They also inform SMT 22 any change in the transmission status.

MAC 28 and 30 each includes registers, H 32, TH 34, and H 36, and TH 38, respectively, which are of interest to the instant invention. H registers 32 and 36 are used to record the synchronous bandwidth allocated to MAC 28 and 30, respectively. Each time MAC 28 and/or 30 begins the transmission of synchronous frames, the contents of corresponding H registers 32 and 36 are loaded into TH registers 34 and 38, respectively. Subsequently, TH registers 34 and 38 counts down until zero upon which it interrupts MAC 28 and 30, respectively, to stop synchronous frame transmission.

Physical layer protocol (PHY) 42 and 46 form the upper sublayer of the physical layer, and is responsible for the encoding or coding, clocking and framing for transmission. Physical medium dependent (PMD) 44 and 48 are coupled to PHY 42 and 46, respectively, and form the lower sublayer of the physical layer. PMD 44 and 48 are responsible for interfacing with the fiber optic transmission medium, handling the optical signal requirements, bit error rates, and other functions.

In operation, SMT 22 and higher level layers are responsible for queuing up synchronous and asynchronous frames for transmission. SMT 22 communicates to MAC 28 and 30 the availability of the frames and requests the capture of the token. Once a token is captured, MAC 28 and 30 transmits the queued frames in accordance with the rules of the timed token protocol. The connection of MAC 28 and 30 with PHY 42 and 46 are controlled through a configuration switch 40, which is in turn controlled by SMT 22. The frames transmitted by MAC 28 and 30 are routed to the appropriate PHY 42 and 46 through configuration switch 40.

Referring to FIG. 3, an alternative architecture 50 of an FDDI dual attachment station is shown. Architecture 50 is substantially similar to that shown in FIG. 2, with some minor differences. SMT 52, which includes SMT frame services 54 and other management components 64, also includes H1, H2 registers 56 and 58, and TH1 and TH2 registers 60 and 62. H1 and TH1 registers 56 and 60 control the synchronous frame transmission of MAC-1 66, and similarly, H2 and TH2 registers 58 and 62 control MAC-2 68. Registers H1, H2, TH1, and TH2 56-62 function and operate as described above in connection with architecture 20 shown in FIG. 2. The other components' organization and functions, such as configuration switch 70, PHY 72 and 76 and PMD 74 and 78 also remain the same as that of architecture 20.

Messages generated in network 10 at run time may be classified as either synchronous or asynchronous. We assume that there are n streams of synchronous messages, $S_1, S_2, \ldots S_n$ in the system which form a synchronous message set M:

$$M = \{S_1, S_2, \ldots S_n\} \tag{1}$$

Although details of the messages in network 10 can be found in FDDI *Token Ring Media Access Control (MAC). ANSI Standard* X3.139, 1987, some selected characteristics of messages are set forth below:

1. Synchronous messages are periodic, i.e., messages in a synchronous message stream have a constant interarrival time. The period length of stream $S_i$ ($i=1,2,\ldots,n$) is denoted as $P_i$.

2. The deadline of a synchronous message is the end of the period in which it arrives. That is, if a message in stream $S_i$ arrives at time t, then its deadline is at time $t+P_i$.

3. Messages are independent in that message arrivals do not depend on the initiation or the completion of transmission requests for other messages.

4. The length of each message in stream $S_i$ is $C_i$ which is the maximum amount of time needed to transmit this message.

The utilization factor of a synchronous message set, U(M), is defined as the fraction of time spent by the network in the transmission of the synchronous messages. That is, $$U(M) = \sum_{i=1}^{n} \frac{C_i}{P_i} \quad (2)$$

where n is the number of synchronous message streams.

Several timed token MAC protocol parameters and variables are defined for its operation and is related to the embodiment of the instant invention. Target Token Rotation Time (TTRT) is the expected value of the token rotation time defined at network initialization time. TTRT is generally selected to be sufficiently small to support the response time requirements of the messages at all the nodes 1-m in the network. Since the time elapsed between two consecutive visits of the token at a node can be as much as (2·TTRT), a node may not be able to transmit any message during this interval. In order to meet message deadlines it is necessary to select TTRT such that, for $1 \leq i \leq n$, $$TTRT \leq \frac{P_i}{2} \quad (3)$$

where $P_i$ may therefore be represented as a linear function of TTRT. That is, $$P_i = m_i \cdot TTRT - \delta_p \quad (4)$$

where $$m_i = \left\lceil \frac{P_i}{TTRT} \right\rceil \geq 2 \text{ and } \delta_i = \left\lceil \frac{P_i}{TTRT} \right\rceil \cdot TTRT - P_i.$$

Note that if $m_i=2$, then $\delta_i=0$ and if $m_i \geq 3$ then $0 \leq \delta_i < TTRT$.

The synchronous bandwidth of node i, ($H_i$), is the maximum time for which a node 1-m is permitted to transmit synchronous messages each time the station receives the token. Note that each node 1-m may be assigned a different $H_i$ value.

The token rotation timer of node i, ($TRT_i$), is a counter which is initialized to TTRT, and counts down until it is equal to zero or until the token is received and the time elapsed since the previous token departure is less than TTRT. In either situation, the $TRT_i$ is reinitialized to TTRT. After being reset, it continues the subsequent counting down cycles in the same manner.

The Token Holding Timer of node i, ($THT_i$), is a counter which is used to control the amount of time for which the node i can transmit asynchronous messages. The Late Counter of node i, ($LC_i$), is used to record the number of times that $TRT_i$ has expired since the last token arrival at node i.

A synchronous bandwidth allocation scheme is defined as a process which, when given as input the values of all $C_i$ and $P_i$ in the message set and the value of TTRT, assigns the values of the synchronous bandwidths $H_i$ to node i in the network. Therefore, if function f represents an allocation scheme. Then, $$f(C_1,C_2,\ldots C_n,P_1,P_2,\ldots P_n,TTRT)=(H_1,H_2,\ldots H_n). \quad (5)$$

The synchronous bandwidths allocated to the nodes 1-m by any scheme must satisfy two constraints in order to ensure that the real time messages can be transmitted before their deadlines and that the timed token protocol requirements are satisfied. The first constraint is the protocol constraint. Theoretically, the total available time to transmit synchronous messages, during one complete traversal of the token around the ring 10, can be as much as TTRT. However, factors such as ring latency $\Theta$ and other protocol/network dependent overheads reduce the total available time to transmit the synchronous messages. The ring latency $\Theta$ is defined as the token walk time around the ring 10 when none of the nodes 1-m in the network disturb it. The portion of TTRT unavailable for transmitting synchronous messages is denoted by the parameter $\tau$. That is, $\tau = \Theta + \Delta$ where $\Delta$ represents the protocol dependent overheads. Furthermore, the ratio $\tau$ to TTRT to be $\alpha$. The usable ring utilization available for synchronous messages would therefore be $(1-\alpha)$.

Thus, the protocol constraint on the allocation of synchronous bandwidths is that the sum total of the synchronous bandwidths allocated to all nodes 1-m in the ring 10 should not be greater than the available portion of TTRT so that:

$$\sum_{i=1}^{n} H_i \leq TTRT - \tau. \quad (6)$$

The second constraint is the deadline constraint. The allocation of the synchronous bandwidths to the nodes 1-m should be such that the synchronous messages are always guaranteed to be transmitted before their deadlines, i.e., before the end of the period in which they arrive. In other words, if $X_i$ is the minimum amount of time available for node i to transmit its synchronous messages in a time interval $(t, t+P_i)$, then $$X_i \geq C_i. \quad (7)$$

Note that $X_i$ will be a function of $H_i$ and the number of token visits to node i in time interval $(t, t+P_i)$.

A message set is defined to be guaranteed by a bandwidth allocation scheme if both the protocol and the deadline constraints are satisfied. Once a message set is guaranteed, messages will be transmitted before their deadlines, as long as the network operates normally.

An allocation scheme is local if it computes the synchronous bandwidth of a node 1-m without using the information of messages of other nodes. The parameters local to node i are $C_i$ and $P_i$. Hence, the allocation function of a local scheme has the form $$H_i = f(C_i, P_i, TTRT). \quad (8)$$

With a local allocation scheme, the calculation of $H_i$ is independent of the message parameters on other nodes. This has an advantage in network run-time management. If a parameter of a message stream on some node is changed, then with a local allocation scheme only the synchronous bandwidth of the involved node has to be adjusted accordingly. No other node is disturbed. In other words, the entire network can continue its normal operation without disturbance while an individual node is changing its message parameters and its synchronous bandwidth.

Recall that any allocation scheme has to satisfy the deadline constraint (7), i.e., a synchronous message should be transmitted within its period. It has been shown that, within a time interval of (2·TTRT), a node may only have one chance to transmit its synchronous message. Hence, a lower bound on the number of token visits within any given period, $P_i$, is given by $$\left\lfloor \frac{P_i}{2 \cdot TTRT} \right\rfloor.$$

Hence, in order to transmit $C_i$ units of synchronous message in a period of $P_i$, node i should have its synchronous bandwidth $$H_i = \frac{C_i}{\left\lfloor \frac{P_i}{2 \cdot TTRT} \right\rfloor}. \qquad (9)$$

On the other hand, it has also been shown that in any given time interval with length $P_i$, the lower bound on the amount of time available for node i to transmit its synchronous message is bounded by $$\left\lfloor \frac{P_i}{TTRT} - 1 \right\rfloor \cdot H_i.$$

In order to satisfy the deadline constraint, this lower bound must be no less than the message length $C_i$. That is, $$\left\lfloor \frac{P_i}{TTRT} - 1 \right\rfloor \cdot H_i \geq C_i. \qquad (10)$$

Hence, the synchronous bandwidth of node i should be $$H_i = \frac{C_i}{\left\lfloor \frac{P_i}{TTRT} - 1 \right\rfloor}. \qquad (11)$$

A generalized form of equations (9) and (11) is as follows:

$$H_i = \frac{C_i}{\left\lfloor a \cdot \frac{P_i}{TTRT} + b \right\rfloor}. \qquad (12)$$

where a and b are two non-negative constants. However, non-negative constants a and b are not independent. They are bounded by several requirements:

Because $H_i$ should be no more than $C_i$, the denominator of equation (12) has to be larger than one. That is, $$a \cdot \frac{P_i}{TTRT} + b \geq 1. \qquad (13)$$

Furthermore, in order to satisfy the deadline constraint, it is necessary to have $$X_i \geq \left\lfloor \frac{P_i}{TTRT} - 1 \right\rfloor \cdot H_i \geq C_i. \qquad (14)$$

Substituting $H_i$ by equation (12) and taking off the floor function, the result is:

$$a \cdot \frac{P_i}{TTRT} + b \leq \frac{P_i}{TTRT} - 1. \qquad (15)$$

The values of both a and b have to satisfy equations (13) and (15) for any $$\frac{P_i}{TTRT} \geq 2.$$

The system of inequalities (13) and (15) are of the form:

$$a \cdot Q + b \geq 1 \qquad (16)$$

and $$a \cdot Q + b \leq Q - 1 \qquad (17)$$

where $$Q = \frac{P_i}{TTRT} \geq 2.$$

The solution of this system of inequalities is as follows:

$$0 \leq a \leq 1 \qquad (18)$$

and $$b = 1 - 2a. \qquad (19)$$

Thus, we can define a class of new local synchronous bandwidth allocation schemes as:

$$H_i = \frac{C_i}{\left\lfloor a \cdot \frac{P_i}{TTRT} + 1 - 2a \right\rfloor} \qquad (20)$$

where $0 \leq a \leq 1$. The allocation schemes defined in equations (9) and (11) are members of this class where $a = \frac{1}{2}$ and $b = 1$ respectively.

It can be shown that for a synchronous bandwidth allocation scheme defined in equation (20) with parameter a ($0 \leq a \leq 1$), its Worst Case Achievable Utilization factor is $$\frac{1 - \alpha}{2 + 1/a} \text{ where } \alpha = \frac{\tau}{TTRT}.$$

In equation (9) an allocation scheme is defined with $a = 2$. Hence, its Worst Case Achievable Utilization is $$\frac{1 - \alpha}{4}.$$

That is, if the total traffic is no more than 25% of available utilization, all the synchronous messages are guaranteed to be transmitted before their deadlines. This is substantially better than known local schemes. Please refer to the table below for a summary and comparison of the allocation schemes. However, the allocation scheme defined in equation (11) is even better, with a Worst Case Utilization $$\frac{1-a}{3}.$$

Note that for $0 < a \leq 1$, $$\frac{1-a}{2 + 1/a}$$

reaches the maximum when $a=1$. Hence, the scheme defined in (11) is the best in the class of allocation scheme defined in (20) in the terms of achieving the highest Worst Case Utilization in its class.

Figure 4:
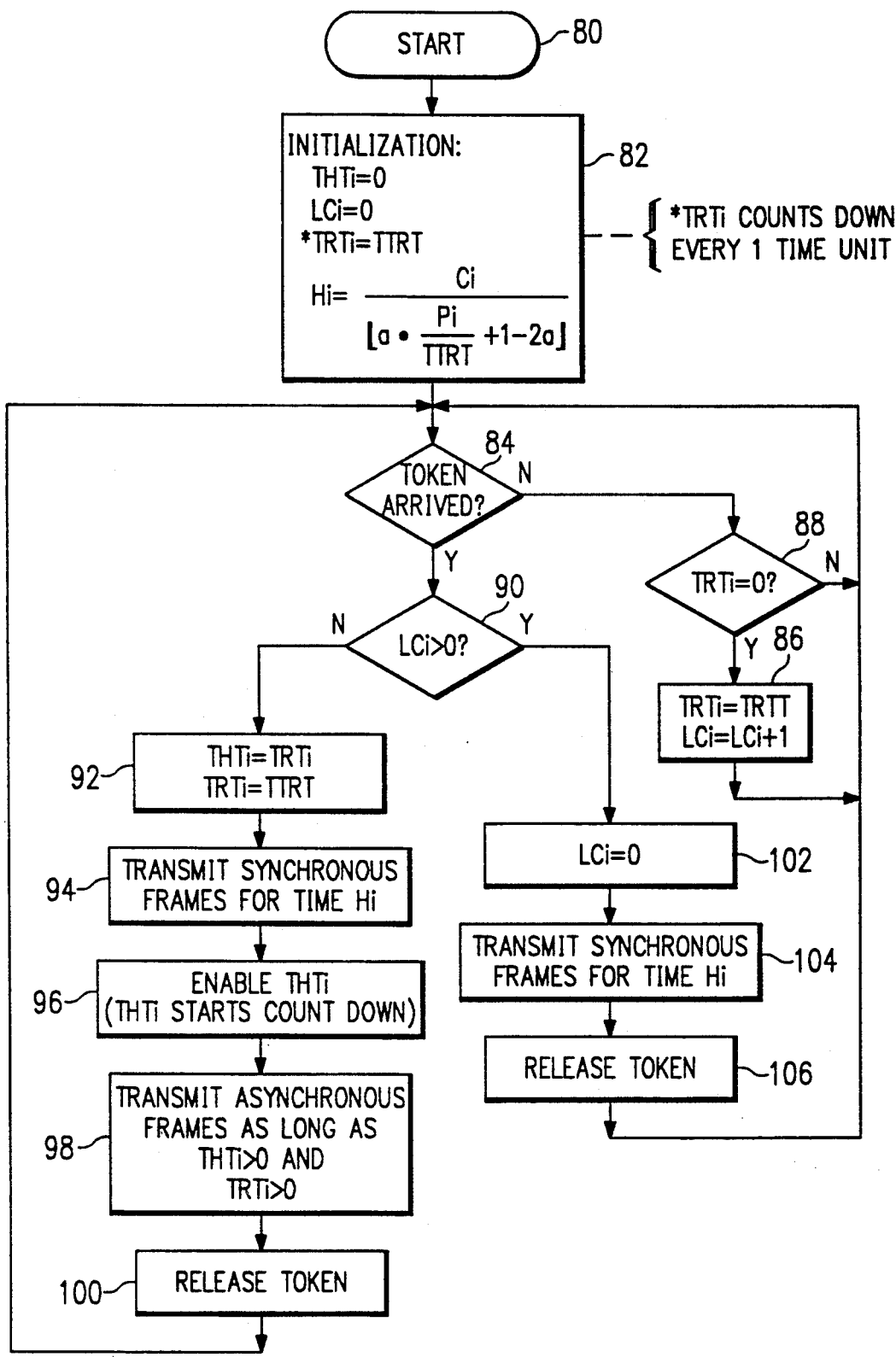
FIG. 4 is a simplified flow chart of a preferred embodiment of the present invention.

Referring to FIG. 4, a flowchart 80 demonstrating the operation of the instant invention is shown. Applying the normalized proportional synchronous bandwidth allocation scheme at network 10 initialization, the parameters are initialized at each nodes $i=1\text{-}m$ so that $THT_i=0$, $LC_i=0$, $TRT_i=TTRT$, and $$H_i = \frac{C_i}{\left[ a \cdot \frac{P_i}{TTRT} + 1 - 2a \right]} \quad (21)$$

as shown in block 82. Recall that $THT_i$ is the token holding timer for node i; $TRT_i$ is the token rotation timer for node i; $LC_i$ is the late counter for node i; and $H_i$ is the synchronous bandwidth allocated to node i. Subsequently, the $TRT_i$ counter is enabled to count down at every time unit. A check is made as to whether a token has arrived, as shown in block 84. If a token has not arrived, a determination is made as to whether $TRT_i$ has reached zero as shown in block 88. If $TRT_i$ has not reached zero, execution returns to block 84. If $TRT_i$ has reached zero, $TRT_i$ is reset to TTRT, and $LC_i$ is incremented by one, as shown in block 86. $TRT_i$ then begins the counting down process again with $LC_i$ being incremented by one at every expiration of $TRT_i$.

Normally, if $LC_i$ exceeds one, the ring recovery process is initiated.

A token is considered to arrive early at node i if $LC_i=0$ at the time of its arrival. The token is late if $LC_i>0$. Therefore if a token has arrived (as determined in block 84), a determination of the status of $LC_i$ is made in block 90. If $LC_i$ is not greater than zero, the parameters are set $THT_i=TRT_i$, $TRT_i=TTRT$, and $TRT_i$ continues to count down as before, as shown in block 92. If there are any synchronous frames, they are transmitted for a maximum time of $H_i$, as shown in block 94. After transmitting the synchronous frames, the node i enables counter $THT_i$ to start counting down, as shown in block 96. The node may then transmit asynchronous frames as long as $THT_i>0$ and $TRT_i>0$, as shown in block 98. Subsequently, the token is released, as shown in block 100.

When the token arrives late at node i, $LC_i$ is greater than zero, and $LC_i$ is reset to zero, as shown in block 102. Note that $TRT_i$ is not reset to TTRT as in the case when the token is early. In block 104, node i transmits synchronous frames, if any, for a maximum time of $H_i$. No asynchronous frame is transmitted. The token is then released in block 106. Whether the token arrived early or late, the execution returns to block 84 to check for capture of any subsequent tokens.

A local scheme such as discussed in the instant invention simplify the network management at run-time. If the parameters of a synchronous message stream on some node are changed, then only the synchronous bandwidth of the node involved will be adjusted when using a local allocation scheme. The scheme defined in equation (20) is especially attractive because it can guarantee synchronous message deadlines for a synchronous traffic of up to 33% of available utilization. Note that to date, this is the highest Worst Case Achievable Utilization.

In summary, four synchronous bandwidth allocation schemes and their analysis results are shown in the following table:

TABLE

Summary of the synchronous bandwidth allocation schemes.

| Name | Formula of $H_i$ | W.C.A.U. | Comments |
|---|---|---|---|
| Full length | $H_i = C_i$ | 0 | Uses local information only, i.e., $C_i$. |
| Proportional | $H_i = \frac{C_i}{P_i} \cdot (TTRT - \tau)$ | 0 | Uses local information only, i.e., $\frac{C_i}{P_i}$. |
| Equal Partition | $H_i = \frac{TTRT - \tau}{n}$ | $\frac{1-\alpha}{3n - (1-\alpha)}$ | Uses global information only, i.e., the number of nodes n. |
| Local synchronous bandwidth allocation | $H_i = \frac{C_i}{\left[ a \cdot \frac{P_i}{TTRT} + 1 - 2a \right]}$ | $\frac{1-\alpha}{2 + \frac{1}{a}}$ | Uses local information only. $\frac{1-\alpha}{2 + \frac{1}{a}}$ is maximized when $a=1$. |

Although the present invention and its advantages have been described in detail, it should be understood that various changes, substitutions and alterations can be made therein without departing from the spirit and scope of the invention as defined by the appended claims.

What is claimed is:

1. A method for real time message transmission in a token ring network having a plurality of nodes, comprising the steps of:

initializing each node in the network, including setting a maximum message transmission time $H_i$ for each node i, $$H_i = \frac{C_i}{\left\lfloor a \cdot \frac{P_i}{TTRT} + 1 - 2a \right\rfloor}$$

where $C_i$ is a transmission time of a message in a message stream, $P_i$ is the period length of the message stream, TTRT is a target token rotation time, and a is a non-negative constant; and transmitting said message stream when a token arrives at a node for duration of $H_i$.

2. The method, as set forth in claim 1, wherein said messages transmitted are synchronous messages.

3. The method, as set forth in claim 1, wherein said initializing step further comprises the steps of:
determining a target token rotation time TTRT;
setting a token rotation timer for node i to equal to said target token rotation time TTRT; and
setting a late counter for node i to zero.

4. The method, as set forth in claim 3, further comprising the steps of:
decrementing said token rotation timer;
incrementing said late counter each time said token rotation timer reaches zero; and
determining whether a token has arrived at node i.

5. The method, as set forth in claim 4, wherein the initializing step further comprises the step of setting a token holding timer to zero.

6. The method, as set forth in claim 5, further comprising the steps of:
determining that said late counter is equal to zero;
setting said token holding timer to the value of said token rotation timer;
setting said token rotation timer to said target token rotation time;
enabling the countdown of said taken rotation timer;
transmitting synchronous messages for time $H_i$;
enabling the countdown of said token holding timer; and
transmitting asynchronous messages until one of said token rotation timer and said token holding timer reaches zero.

7. In a token ring network connecting a plurality of nodes, said nodes communicating with one another by transmitting messages, and said nodes transmit said messages only when a token is received, a method for allocating a maximum message transmission time $H_i$ for each node i, the method comprising the steps of:
computing for $H_i$, such that:

$$H_i = \frac{C_i}{\left\lfloor a \cdot \frac{P_i}{TTRT} + 1 - 2a \right\rfloor},$$

where $C_i$ is a transmission time of a message in a message stream, $P_i$ is a period length of the message stream, a is a non-negative constant; and TTRT is a target token rotation time;
initializing each node i with respective computed $H_i$; and
transmitting said messages when said token is captured by node i for the duration of respective computed $H_i$.

8. The method, as set forth in claim 7, wherein said transmitted messages are synchronous messages.

9. Apparatus for allocating a maximum message transmission time $H_i$ for node i in a token ring network connecting a plurality of nodes, said nodes communicating with one another by transmitting messages, and said nodes transmit said messages only when a token is received, the apparatus comprising:
a processor computing for $H_i$, such that:

$$H_i = \frac{C_i}{\left\lfloor a \cdot \frac{P_i}{TTRT} + 1 - 2a \right\rfloor},$$

where $C_i$ is a transmission time of a message in a message stream, $P_i$ is the period length of the message stream, TTRT is a target token rotation time, and a is a non-negative constant;
means for initializing each said nodes with respective computed $H_i$; and
means for transmitting said messages for the duration of respective computed $H_i$ when said token is received at node i.

10. Apparatus for allocating a maximum message transmission time $H_i$ for node i in a token ring network connecting a plurality of nodes, said nodes communicating with one another by transmitting messages, and said nodes transmit said messages only when a token is received, the apparatus comprising:
a processor computing for $H_i$, such that:

$$H_i = \frac{C_i}{\left\lfloor \frac{P_i}{2 \cdot TTRT} \right\rfloor}, \quad (9)$$

where $C_i$ is a transmission of a message in a message stream, TTRT is a target token rotation time, and $P_i$ is the period length of the message stream;
means for initializing each said nodes with respective computed $H_i$; and
means for transmitting said synchronous messages for the duration of respective computed $H_i$ when said token is received at node i.

* * * * *